Patented Jan. 8, 1946

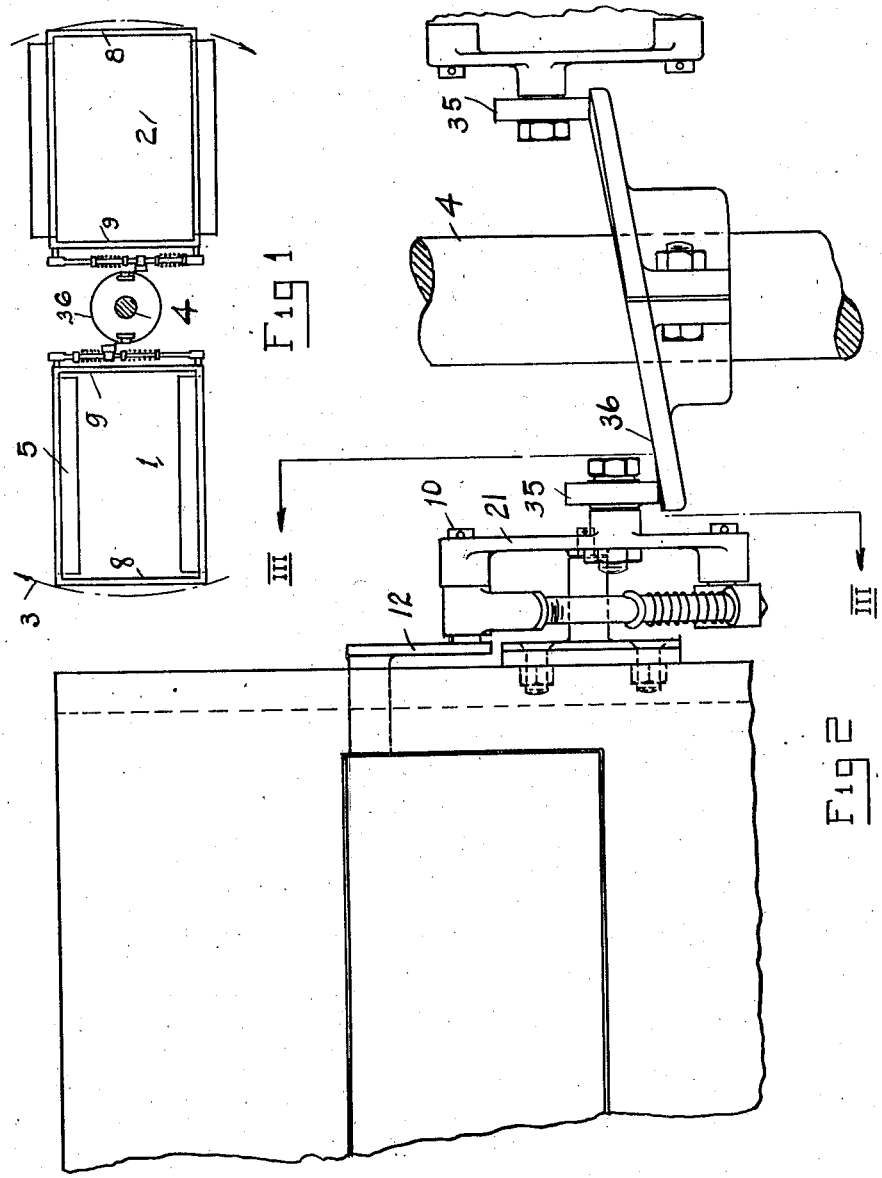

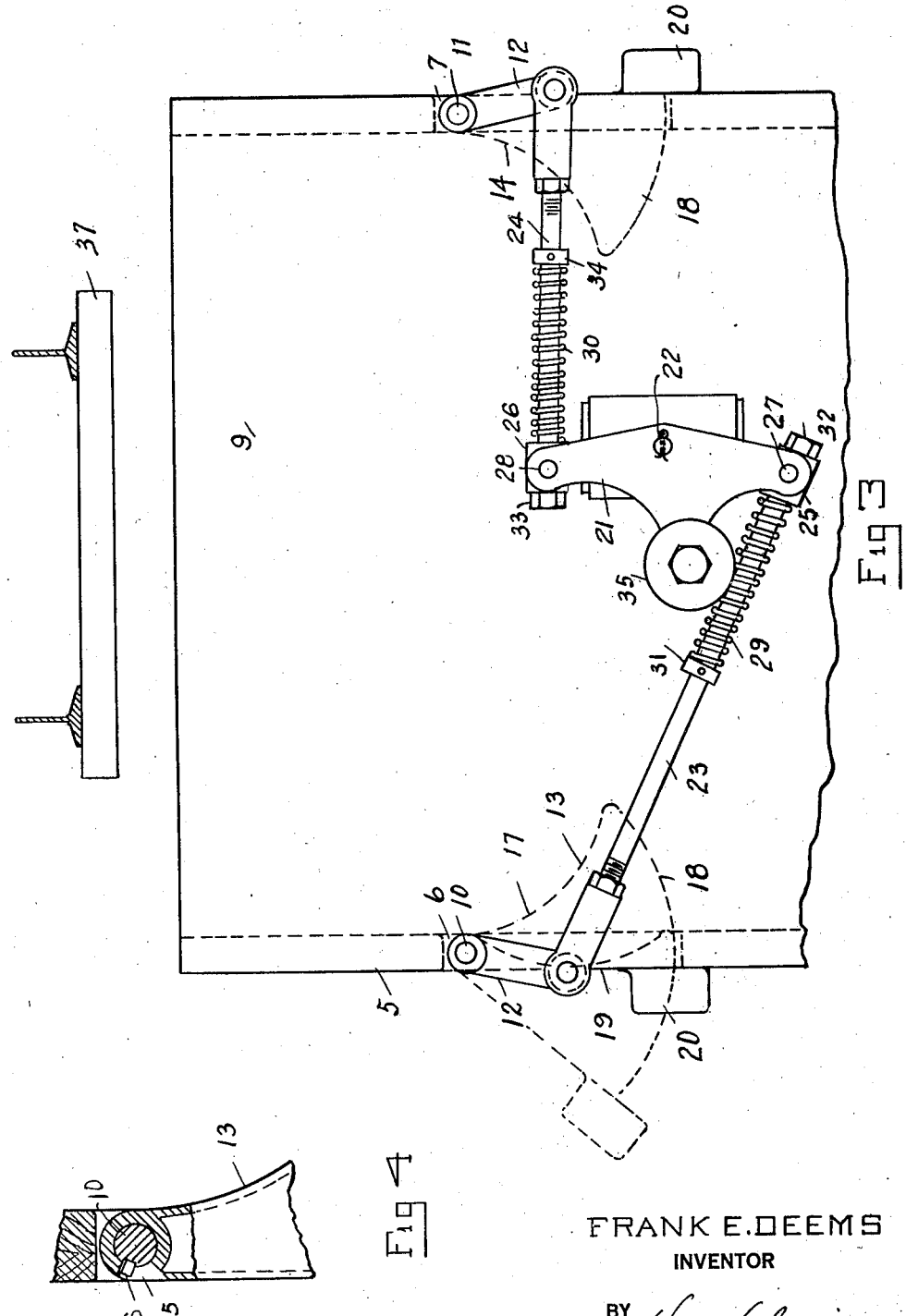

2,392,465

UNITED STATES PATENT OFFICE 2,392,465

BALING PRESS DOG

Frank E. Deems, Birmingham, Ala., assignor to Continental Gin Company, a corporation of Delaware Application May 1, 1944, Serial No. 533,479

7 Claims. (Cl. 100—30)

This invention relates to baling presses, and more particularly to open top cotton presses, and has among its principal objects the following: the provision of a press dog and mechanism for operating the same which shall include members mounted to swing by gravity and assume a normal position with one side inclined inwardly of the press box, and to be pushed outwardly by cotton being packed into the press box, together with means to release the dogs and move them outwardly of the press box when the cotton has been packed, also a press dog which shall present a continuous surface across the press box and include means to limit inward movement thereof; and further a press dog presenting a continuous surface across the press box and which shall be effective in all positions to close the opening in the press box in which it is mounted.

Apparatus embodying features of my invention is illustrated in the accompanying drawings forming a part of this application, in which Fig. 1 is a plan view of a cotton baling press embodying features of my invention;

Fig. 2 is a fragmentary elevational view of the same;

Fig. 3 is an end view of one of the press boxes and press dog operating mechanism looking in the direction indicated by the line III—III in Fig. 2; and Fig. 4 is a detail sectional view of a press dog.

Referring to the drawings, I show in Fig. 1 similar press boxes 1 and 2 mounted to turn in an arc 3 around a center post 4. The press boxes being similar, a description of one will be sufficient. The sides of the press boxes 5 are provided with openings 6 and 7 which extend substantially the entire distance across the boxes. The ends of the press boxes are indicated at 8 and 9 and the end 9 has mounted thereon operating mechanism which will be described later.

Suitably supported in the upper part of each of the openings 6 and 7 and extending across the width of the press box are shafts 10 and 11. A crank arm 12 depending from each of the shafts provides means by which the shafts may be oscillated. Mounted on the shafts 10 and 11, respectively, are press dogs 13 and 14. As may be seen in Fig. 4, each of the press dogs is provided with an elongated slot 15 and the shaft with which it is associated is provided with a key 16 extending into the slot whereby the press dog may swing on the shaft outwardly of the press box.

Each of the press dogs 13 and 14 is generally triangular in cross section having an inner side 17, a lower side 18 and an outer side 19. The lower side 18 is convex, or cylindrical with the shaft on which it is mounted as a center, and has relatively close clearance with respect to the lower boundary of the opening in which the dog fits so that as the dog oscillates the gap between the dog and the opening remains the same. The inner side 17 is preferably somewhat concave as shown in Fig. 3 to afford more even packing of the cotton in the press box. Secured to the outer side 19 of the press dog is a weight 20 which functions to bias the dog inwardly of the press box so that the inner side 17 normally projects into the press box at an inclination to the side of the box. It will be seen that as cotton is packed into the press box, the dogs are free to swing outwardly due to the limited relative movement permissible between the dog and the shaft, and that the weights 20 will move the dogs inwardly of the press box and prevent the return of the cotton as pressure is removed from it. The weights 20 also function to limit inward movement of the press dogs and to close entirely the gap underneath the press dogs when in their innermost positions and thus prevent cotton from being crowded out through the openings.

As is well understood, baling presses of the kind herein described have one press box positioned under the tramper while the other press box is positioned so that the bale previously tramped may be subjected to pressure from a suitable ram, not shown, and tied out and removed from the press. When in the latter position, it is necessary that the press dogs be swung outside the plane of the sides of the press box. In Fig. 1, press box 1 is in position to be packed by the tramping mechanism, while press box 2 is in position for the bale to be pressed and tied out. In order to swing the dogs 13 and 14 outwardly of the press box, I provide a rocker plate 21 pivoted on the end 9 of the press box at 22. Links 23 and 24 connect opposite ends of the rocker plate to the lower ends of crank arms 12. Sleeves 25 and 26 are slideably mounted on the links 23 and 24 respectively and are pivotally connected to the lower and upper ends of the rocker plate 21 at 27 and 28. The sleeves 25 and 26 bear against springs 29 and 30 mounted respectively on the links 23 and 24. A nut 32 on the outer end of the link 23 and a collar 31 on the link serve to restrain the spring 29 and prevent the link from moving out of the sleeve 25. A similar nut 33 and collar 34 co-act with the link 24 and spring 30 in a similar manner. There is thus provided a yieldable connection between the rocker plate 21 and each of the links.

Mounted on the rocker plate 21 and laterally offset with respect to the pivot 22 is a roller 35 which bears on a cam 36 mounted on the center post 4. As will be seen in Fig. 2, when the press boxes are in the position shown, the roller 35 on the press box 1 is in its lowest position while the corresponding roller 35 on the press box 2 is in its highest position. It will also be seen from Fig. 3 that with the roller 35 in its lowest position, the links 23 and 24 are in their innermost positions and the press dogs 13 and 14 are hanging inwardly of the press box. When the press boxes are turned, and the roller 35 moves to its highest position, the rocker plate 21 is swung about its pivot, pushing the links outwardly and oscillating the shafts 10 and 11. As the shafts 10 and 11 oscillate, the keys 16 engage the upper sides of the slots 15 and swing the press dogs outwardly to a position outside the box, as shown in connection with press box 2 in Fig. 1 and by dotted lines in Fig. 3.

In Fig. 3, I show the tramper follow block 37 over the press box 1 in position to pack cotton downwardly into the press box. The follow block 37 is made slightly narrower than the shortest distance between the dogs 13 and 14 when in their innermost positions. As cotton is moved downwardly into the press box by the tramper, its pressure moves the dogs outwardly and as soon as the follow block 37 passes the dogs they are swung inwardly by the weights 20, the follow block being free to pass them on the up stroke while the cotton is engaged by the lower surface 18 on the re-bound and prevented from passing the dogs.

From the foregoing it will be apparent that I have devised an improved baling press dog and mechanism for operating the same which presents a continuous surface to the cotton being packed into the press box and is adapted to restrain the re-bound of cotton when pressure is removed. It will also be seen that my improved press dog is effective in all positions to close the opening in the press box in which it is mounted.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a baling press, a press box having opposed sides each having a continuous opening substantially the width thereof, a shaft mounted to extend along near the top of each opening, a press dog generally triangular in cross section mounted on each shaft and disposed to hang downwardly from the shaft and fill the opening with one side extending into the press box and inclined to the side of the press box, means providing limited relative angular movement between the shaft and the dog whereby material being charged into the press pushes the dogs outwardly, means to bias the lower sides of the dogs inwardly of the press to engage the material and prevent its return, and means to rock the dogs outwardly of the press to release the material.

2. In a baling press, a press box having opposed sides each having a continuous opening substantially the width thereof, a shaft mounted to extend along near the top of each opening, a press dog generally triangular in cross section mounted on each shaft and disposed to hang downwardly from the shaft and fill the opening with one side extending into the press box and inclined to the side of the press box, means providing limited relative angular movement between the shaft and the dog whereby material being charged into the press pushes the dogs outwardly, a weight extending along the lower outer side of each of the dogs to bias it inwardly of the press box and overhang the opening to limit the inward movement thereof, a crank on the end of each shaft, and link and lever means operative responsive to movement of the press box to engage the cranks and rock the dogs outwardly of the press to release the material.

3. Apparatus as defined in claim 2 in which the lower surface of the dog is cylindrical with the shaft at the center thereof.

4. In a press box, opposed sides each having a continuous opening extending substantially the width of the box, a shaft mounted in the upper part of each opening, a press dog generally triangular in cross section mounted on each shaft to close the opening and having limited relative movement with respect to the shaft, whereby as material being baled is packed in the press box the dogs are pushed outwardly to permit the material to pass, a weight on each of the dogs to bias it inwardly of the box and disposed to close the opening under the dog, and means to move the dogs outwardly of the press box.

5. In a baling press, a press box, opposed sides for the press box having continuous transverse openings therein, a press dog pivotally mounted in the upper part of each of the openings to hang downwardly and substantially close the same, each of said dogs being generally triangular in shape with the lower side a section of a cylinder and with the pivot of the dog as a center, said dogs being weighted to cause one side to project inwardly into the press box during the tramping operation.

6. In a down packing cotton press having an open top box with opposed side walls having openings extending across the box, press dogs generally triangular shaped in cross section mounted in said openings and hinged at the top to hang downwardly and close the openings and normally to present an inclined surface inwardly of the press box and adapted to swing outwardly as cotton is packed into the press box, the lower surface of each of said dogs forming the section of a cylinder with the hinge point as its center, and a weight joined to the outside of each of said dogs at the bottom thereof to bias the dog inwardly of the box and close the opening in the box along the bottom of the dog.

7. In a baling press having an open top box with opposed side walls having openings across the box, press dogs triangular shaped in cross section mounted in said openings and hinged at the top to hang downwardly and substantially close the openings and normally to present an inclined surface inwardly of the press box and adapted to swing outwardly as cotton is tramped into the press box, a weight joined to the outside of each of said dogs at the bottom thereof to bias the dog inwardly of the box and close the opening in the box along the bottom of the dog, and means to rock the dogs outwardly of the press to release material therein.

FRANK E. DEEMS.